United States Patent Office 2,791,611
Patented May 7, 1957

2,791,611

PREPARATION OF CYCLOHEXANONE OXIMES AND ETHERS THEREOF

Lorraine Guy Donaruma, Woodbury, N. J., assignor to E. I. du Pont de Nemours and Company, Wilmington, Del., a corporation of Delaware No Drawing. Application October 25, 1954,
Serial No. 464,631

8 Claims. (Cl. 260—566)

The present invention relates to a process for the production of caprolactam intermediates. More particularly, the present invention relates to a process for the production of cyclohexanone oxime and cyclohexanone oxime O-alkyl ethers.

Ketoximes, particularly cycloaliphatic ketoximes, have long been used as intermediates in the production of amides and lactams. For example, cyclohexanone oxime, the most important member of this class, has served as an intermediate in the production of caprolactam which generally is produced by Beckmann rearrangement of the cyclohexanone oxime. The O-alkyl ethers of cyclohexanone oxime are also known to undergo rearrangement to yield caprolactam. Heretofore, the production of these caprolactam intermediates has usually been effected by processes wherein cyclohexanone or nitrocyclohexane or its salts are treated with hydroxylamine salts and the like. Other known methods of producing the caprolactam intermediates from nitrocyclohexane and its salts include treatments, e. g., with ammonia, amines, sulfides, olefins, alkylene oxides, hydrogen, and the like, but these processes are unattractive because of the cost of reagents and equipment, poor yields, and contamination of the desired products, etc. Hence, although such processes have generally been made to produce satisfactory caprolactam intermediates, the need has long been recognized for a simple process whereby the caprolactam intermediates could be produced efficiently with the use of cheap, readily available, stable materials.

Accordingly, an object of the present invention is to provide an improved process for the production of caprolactam intermediates. Another object of the present invention is to provide an economical process for the production of cyclohexanone oxime and its O-alkyl ethers. A still further object of the present invention is to provide an efficient process for the conversion of salts of nitrocyclohexane to useful caprolactam intermediates. Other objects will become apparent as the invention is further described.

I have found that the foregoing objects can be accomplished when a dialkyl sulfate is added to a salt of nitrocyclohexane in the presence of a solution of a strong base.

In accordance with the process of the present invention, a dialkyl sulfate, e. g., dimethyl sulfate or diethyl sulfate, is added to a salt, e. g., an alkali metal salt, of nitrocyclohexane in the presence of a solution, e. g., a water solution or an ethanol solution, of a strong base, for instance an alkali metal hydroxide, the temperature during the addition of the dialkyl sulfate being maintained above 15° C.

The following examples serve to illustrate specific embodiments of the method of carrying out the present invention, but they will be understood to be illustrative only and not to limit the invention in any way.

Example 1

The runs recorded in the table below were made according to the following procedure. In each run, the nitrocyclohexane was dissolved in an aqueous sodium hydroxide solution. The dimethyl sulfate then was added to this solution at a rate such that the temperature of the solution during the addition was maintained within the range specified. Following completion of the addition of the dimethyl sulfate, the reaction mixture was brought to a pH below 7 and then was extracted with ether. The ether was removed from the extract by distillation, and the residue was distilled in vacuo to give cyclohexanone oxime and cyclohexanone oxime O-methyl ether in the specified yields, which yields collectively corresponded to the total yield of caprolactam intermediates.

| Run | Reactants (parts) | | | | Temperature (°C) during addition of $(CH_3)_2SO_4$ to sodium NCH* solution | Cyclohexanone oxime produced | | Cyclohexanone oxime O-methyl ether produced | | Total yield of caprolactam intermediates (Percent) |
|---|---|---|---|---|---|---|---|---|---|---|
| | NCH* | NaOH | $H_2O$ | $(CH_3)_2SO_4$ | | parts | yield (Percent) | parts | yield (Percent) | |
| A | 26 | 16 | 200 | 38 | 90–95 | 6.0 | 26.6 | 11.4 | 44.7 | 71.3 |
| B | 26 | 16 | 200 | 38 | 50–55 | 6.5 | 28.7 | 11.6 | 45 | 73.7 |
| C | 26 | 16 | 200 | 38 | 17–27 | 4.0 | 17.7 | 5.6 | 22 | 39.7 |
| D | 26 | 12 | 200 | 25 | 50–55 | 6.9 | 30.5 | 8.3 | 32.6 | 63.1 |
| E | 129 | 80 | 1,000 | 189 | 50–55 | 29.2 | 26 | 52 | 41.6 | 67.6 |
| F | 65 | 20 | 80 | 65 | 50–60 | 14.4 | 25.2 | 5.3 | 8.4 | 33.6 |
| G | 26 | 16 | 75 | 38 | 50–55 | 6.0 | 26.5 | 10 | 39.3 | 65.8 |

*NCH=nitrocyclohexane.

Example 2

Nitrocyclohexane in the amount of 26 parts (0.2 mole) was dissolved in 200 parts of water containing 20 parts (0.35 mole) of potassium hydroxide. To this solution then was added 38 parts (0.25 mole) of diethyl sulfate, the rate of addition being so controlled that the temperature of the solution was held between 50 and 90° C. After the mixture had been worked up by the method of the foregoing example, there was obtained 4.1 parts of cyclohexanone oxime (18% yield) and 9.3 parts of cyclohexanone oxime O-ethyl ether (33% yield). This corresponded to a 51% overall yield of caprolactam intermediates.

Example 3

Nitrocyclohexane in the amount of 26 parts (0.2 mole) was dissolved in 200 parts of ethanol containing 8 parts (0.2 mole) of sodium hydroxide and 6 parts (0.1 mole) of potassium hydroxide. To this solution then was added 25 parts (0.2 mole) of dimethylsulfate, the dimethyl sulfate being introduced at a rate such that the temperature of the solution during the addition remained within the range of 50 to 55° C. The method of the foregoing examples was used in working up the mixture. Cyclohexanone oxime in the amount of 7.3 parts and cyclohexanone oxime O-methyl ether in the amount of 3.8 parts, were recovered. This corresponded to yields of the oxime and the oxime ether of 31.2% and 15%, respectively, or to a total yield of caprolactam intermediates of 46.2%.

Example 4

Twenty-six parts (0.2 mole) of nitrocyclohexane was dissolved in 200 parts of water containing 16 parts (0.4 mole) of sodium hydroxide. Into this solution was introduced 38 parts (0.3 mole) of dimethyl sulfate, the rate of addition being so controlled as to hold the temperature of the solution between 50 and 60° C. After the addition of the dimethyl sulfate was complete, 4 parts (0.06 mole) of hydroxylamine hydrochloride was added. The procedure of the foregoing examples was used in working up the mixture. Cyclohexanone oxime and cyclohexanone oxime O-methyl ether were obtained in the amount of 13.1 parts (58% yield) and 5.8 parts (23.8% yield), respectively. This corresponded to an overall yield of caprolactam intermediates of 82.8%.

As the foregoing examples show, caprolactam intermediates are obtained in the process of the present invention when a temperature above 15° C. is maintained during the addition of the dialkyl sulfate to the salt of nitrocyclohexane, when the dialkyl sulfate and the salt of nitrocyclohexane are used in a molar ratio of at least 1/1, and when the strong base and the dialkyl sulfate are present in a molar ratio of at least 1/1. However, the examples also show that the caprolactam intermediates are recovered in the highest yields in the process of the invention when molar ratios slightly above the described minimum levels are employed. For example, as the runs of Example 1 show, the best yields of the caprolactam intermediates are obtained when the dialkyl sulfate and the salt of nitrocyclohexane are present in a molar ratio of 1.5/1, and when the strong base and the dialkyl sulfate are used in molar ratios of 1.3/1 to 1.5/1. The examples additionally show that when the optimum molar ratios are used, maintenance of a temperature between about 50 and about 100° C. during the addition of the dialkyl sulfate to the salt of nitrocyclohexane in the presence of the solution of the strong base enhances the yield of the caprolactam intermediates obtained in the process of the invention. Example 4 illustrates a means of further increasing the yield of the caprolactam intermediates wherein a small amount of a hydroxylamine salt, e. g., an amount such that the molar ratio of the hydroxylamine salt and the salt of nitrocyclohexane is between about 0.1/1 and about 0.4/1, is added to the reaction mixture following the addition of the dialkyl sulfate.

The foregoing examples, particularly Example 1, illustrate a means of recovering the caprolactam intermediates produced in the process of the present invention. For example, following the addition of the dialkyl sulfate, the reaction mixture can be brought to a pH below 7 by the addition of any suitable acidic material, and the desired intermediates separated therefrom, e. g., by extraction. If desired, the cyclohexanone oxime and the cyclohexanone oxime O-alkyl ether produced can also be separated, for example, by distillation under vacuum. Furthermore, in the process of the invention, the alkali metal salt of the monoalkyl sulfate formed as by-product can be easily recovered, acidified, and economically distilled with or without the appropriate alkanol to convert it to the dialkyl sulfate for further use in the process.

The present invention is not limited to the materials employed in the foregoing examples. For example, the ammonium salt of nitrocyclohexane can be used in place of the sodium or potassium salts of nitrocyclohexane. Likewise, other dialkyl sulfates can be substituted for the dimethyl sulfate or the diethyl sulfate employed in the examples; for example, di-n-propyl sulfate or diisobutyl sulfate can be used. The examples similarly illustrate the use of water and ethanol solutions of alkali metal hydroxides, such as sodium and potassium hydroxide, as the strong base in the process of the invention, but other solvents for the base, e. g., methanol or isopropanol, can be efficiently and economically employed. Moreover, the use of various amounts of the solvents for the base in the runs of the examples shows that the quantity of solvent employed is not critical in the present process. The use of the inert solvents in greater or lesser amount serves primarily as a means of controlling the strongly exothermic nature of the reaction in the process of the invention.

In the foregoing, the process of the invention has been carried out batchwise, but a continuous process is equally feasible, e. g., by continuously adding the dialkyl sulfate to the salt of the nitrocyclohexane in the presence of strong base, the quantity of reactants being maintained such that at least a 1/1 molar ratio of the dialkyl sulfate and the nitrocyclohexane salt and at least 1/1 molar ratio of the base and the dialkyl sulfate are continuously present in the reaction zone, continuously removing and neutralizing the product to a pH below 7, and continuously separating the caprolactam intermediates from the neutralized mixture. If a hydroxylamine salt is used to enhance the yield of the caprolactam intermediates, it can be introduced into the product mixture continuously, e. g., as the latter comes from the reaction zone where the dialkyl sulfate is added.

As is shown in the foregoing, the products of the process of the present invention are important caprolactam intermediates. For example, the cyclohexanone oxime and the cyclohexanone O-alkyl ethers produced can be rearranged to caprolactam separately or together by any suitable rearrangement process, e. g., by the process taught in U. S. Patent 2,487,246, issued November 8, 1949. However, the use of the products of the process of the present invention is not limited to the production of caprolactam. Cyclohexanone oxime and its O-alkyl ethers prepared by the process of the invention are also useful as solvents, intermediates for chemical syntheses, and the like.

The invention has been described in detail in the foregoing. It will be apparent to those skilled in the art that many variations can be introduced without departing from the spirit and scope of the invention. I intend, therefore, to be limited only by the following claims:

1. A process for the production of cyclohexanone oxime and cyclohexanone oxime O-alkyl ethers which comprises reacting at least equimolar amounts of a dialkyl sulfate of the group consisting of dimethyl- and diethyl-sulfates and an alkali metal salt of nitrocyclohexane in the presence of at least an equimolar amount of an alkali metal hydroxide dissolved in a solvent selected from the group consisting of water, lower alkanols, and lower alkanol-water mixtures, at a temperature between about 15 and about 100° C.

2. The process as claimed in claim 1, wherein a temperature between about 50 and about 100° C. is used.

3. The process as claimed in claim 1, wherein a molar ratio of dialkyl sulfate to alkali metal salt of nitrocyclohexane of 1/1 to 1.5/1 is used.

4. The process as claimed in claim 1, wherein the molar ratio of strong inorganic base to dialkyl sulfate of 1.3/1 to 1.5/1 is used.

5. A process for the production of cyclohexanone oxime and cyclohexanone oxime O-methyl ether which comprises reacting at least equimolar amounts of dimethyl sulfate and an alkali metal salt of nitrocyclohexane in the presence of at least an equimolar amount of a strong inorganic base dissolved in a solvent selected from the group consisting of water, lower alkanols, and lower alkanol-water mixtures, at a temperature between about 15 and about 100° C.

6. The process as claimed in claim 1, wherein the alkali metal salt of nitrocyclohexane is the sodium salt of nitrocyclohexane.

7. The process as claimed in claim 1, wherein the lower alkanol is ethanol.

8. The process as claimed in claim 1, wherein a salt of hydroxylamine is added to the reaction mixture following the addition of the dialkyl sulfate.

No references cited.